United States Patent [19]
Fanshier et al.

[11] Patent Number: 5,933,601
[45] Date of Patent: *Aug. 3, 1999

[54] METHOD FOR SYSTEMS MANAGEMENT OF OBJECT-BASED COMPUTER NETWORKS

[75] Inventors: Stephen R. Fanshier; My Tien Pare, both of San Diego; Anthony Bautista Nacional, Oceanside; Steven Lynn Klekas, Poway, all of Calif.

[73] Assignee: NCR Corporation, Dayton, Ohio

[*] Notice: This patent is subject to a terminal disclaimer.

[21] Appl. No.: 08/722,383

[22] Filed: Sep. 30, 1996

[51] Int. Cl.$^6$ ............................. G06F 15/16; G06F 15/00
[52] U.S. Cl. ............................. 395/200.53; 395/200.54; 395/683; 345/969
[58] Field of Search ................... 395/200.53, 200.54, 395/683, 183.02; 345/969

[56] References Cited

U.S. PATENT DOCUMENTS 5,513,343  4/1996  Sakano et al. .................... 395/183.02
5,692,184  11/1997 Ardoin et al. ......................... 707/103
5,751,962  5/1998  Fanshier et al. .................. 395/200.53

OTHER PUBLICATIONS

William Stallings, "Understanding OSI Network Management", Dr. Dobb's Journal, Dec. 1993.

William Stallings, "SNMP, SNMPv2 and CMIP: The Practical Guide to Network Management Standards", Addison--Wesley Publishing Co., Part 2, 1993.

Primary Examiner—Frank J. Asta
Assistant Examiner—Ivan C. Pierce, III
Attorney, Agent, or Firm—Gates & Cooper

[57] ABSTRACT

A method, apparatus, and article of manufacture for object based systems management of a computer network. An object based representation of the network is stored in a memory of a computer. The object-based representation comprises one or more objects linked together in the memory to form a hierarchy, wherein each of the objects represents the network, one or more nodes within the network, or one or more components executed by each of the nodes within the network. Each of the objects stores systems management information about the network, node, or component. A utility interface selects the objects to be manipulated by the computer to perform systems management functions for the network.

9 Claims, 5 Drawing Sheets

METHOD FOR SYSTEMS MANAGEMENT OF OBJECT-BASED COMPUTER NETWORKS

CROSS-REFERENCE TO RELATED APPLICATIONS

This application is related to application Ser. No. 08/571,499, entitled "APPLICATION PROGRAMMING INTERFACE FOR OBJECT-BASED SYSTEMS MANAGEMENT OF COMPUTER NETWORKS," filed on Dec. 13, 1995, by Stephen Fanshier et al.; and to application Ser. No. 08/572,251, entitled "OBJECT BASED SYSTEMS MANAGEMENT OF COMPUTER NETWORKS," filed on Dec. 13, 1995 by Stephen Fanshier et al.; both of which are incorporated by reference herein.

BACKGROUND OF THE INVENTION

1. Field of the Invention

This invention relates in general to computer networks, and in particular to an interface for object based systems management of computer networks.

2. Description of Related Art

An important trend in the industry is the development of client/server architectures in distributed computing environments to support transaction processing applications. Currently, distributed computing environments typically comprise interconnected mainframes, minicomputers, servers and workstations. This integration of mainframes, minicomputers, servers and workstations into a distributive computing environment creates the need for system management tools capable of operating in this environment.

SUMMARY OF THE INVENTION

The present invention discloses a method, apparatus, and article of manufacture for object based systems management of a computer network. An object based representation of the network is stored in a memory of a computer. The object-based representation comprises one or more objects linked together in the memory to form a hierarchy, wherein each of the objects represents the network, one or more nodes within the network, or one or more components executed by each of the nodes within the network. Each of the objects stores systems management information about the network, node, or component. An interface performed by the computer specifies the objects in the memory of the computer to be manipulated by the computer to perform systems management functions for the network.

An object of the present invention is to provide enhanced tools for systems management of computer networks. Yet another object of the present invention is to provide an improved method of storing information on the networks, nodes with the networks, and components executed by the nodes. Still another object of the present invention is to provide a method for customers and third party vendors to create their own systems administration utilities.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1:
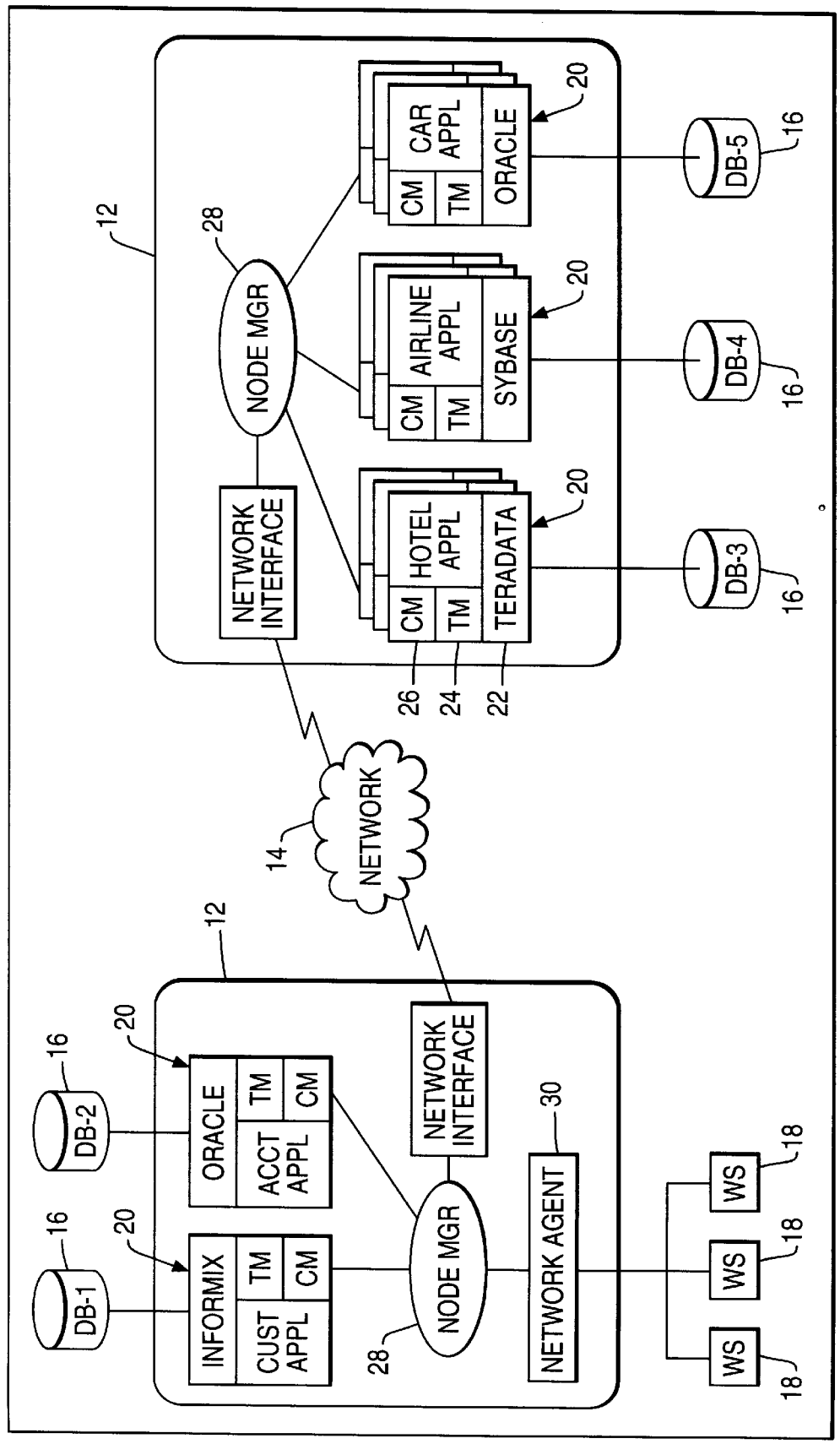
FIG. 1 is an exemplary illustration of a distributed computing environment known as a TOP END™ system.

FIG. 1 is an exemplary illustration of a distributed computing environment 10, known as a TOP END™ system. The present invention comprises a method, apparatus, and program product for facilitating the systems administration of such distributed computing environments.

A TOP END system 10 is comprised of one or more nodes 12 interconnected by a network 14, wherein each of the nodes 12 is comprised of one or more computers. Each of the nodes 12 is typically coupled to one or more fixed and/or removable data storage units (DSUs) 16, such as disk drives, that store one or more databases.

In the exemplary environment of FIG. 1, a client-server architecture is disclosed. At least one of the nodes 12 provide the connection to client systems operating on workstations 18. Operators of the TOP END system 10 use a workstation 18 or terminal to transmit electrical signals to and from server systems operating on the node 12 in the TOP END system 10, wherein the electrical signals represent commands for performing various functions in the TOP END system 10, such as search and retrieval functions against the databases. Those skilled in the art will recognize, however, that the present invention has application to any function or software that can be performed by a TOP END system 10.

According to the present invention, these functions are divided into several modular components 20 that are designed for a distributed, message-passing computing environment. In TOP END terminology, a "component" 20 is a process or logical group of processes that performs one or more functions. The components 20 work together to process distributed transactions initiated by the client systems.

Work is divided among the nodes 12 in the TOP END system 10 by spreading the location of these modular components across the nodes 12. Thus, each node 12 performs some localized function and work is managed by the system 10 so that a sequence of multiple functions comprising a client request is performed by one or more of the modular components on one or more of the nodes 12 in the system 10.

The fundamental component 20 in a TOP END system 10 is the application component 20. Application components 20 are used to create and grow distributed TOP END systems 10. The application components 20 could be user-written, provided as a solution by an independent vendor, or supplied as part of the TOP END system 10. In a TOP END system 10, a comprehensive set of services and libraries are available to an application component 20, including resource managers 22 such as database management systems (DBMS), transaction managers 24, communications managers 26.

Another component of a TOP END system 10 is the node manager 28. The node manager 28 is a collection of processes that offer core services to coordinate processing among nodes 12. These processes, in general, work independently of each other. Services provided by the node manager 28 include transaction management (for example, commit coordination), logging, failure recovery, client/server request handling, security management, runtime administration, and application component 20 control.

One of the transaction management services provided by the node manager 28 is Recoverable Transaction Queuing (RTQ), which prioritizes transaction requests such that the requests will be performed when the system 10 is able to perform the request.

Still another component of a TOP END system 10 is the network agents 30. Network agents 30 are used to allow transactions and service requests to enter a TOP END system 10 from an application component 20 or networked workstation 18 that does not have a node manager 28 on it.

The TOP END system 10 also provides a myriad of tools for managing the distributed computing environment. More specifically, a TOP END system 10 provides a full range of graphical, menu-based administrative tools that make it easy to manage distributed computing environments. The systems administration tools are used to perform component start-up and shutdown, manage auditing and recovery, activate communication links, perform automatic software distribution, and so on.

For high availability reasons, there are two levels of administration provided: global and single node. Global administration provides a single operational view of the TOP END system 10 allowing administrators to control all nodes 12 from a single workstation 18. For certain failure situations, however, single node systems administration can be used to accomplish controlled administration on a node-by-node basis.

In the prior art, management of TOP END systems 10 is handled by a small collection of administrative utilities. These utilities perform the basic administrative functions required by system administrators. Different customers have different requirements, however, which are not performed by the existing utilities. Thus, a need was seen to allow customers and third party vendors to create their own systems administration utilities for TOP END systems 10, customized to their needs.

Systems Management Interface

Figure 2:
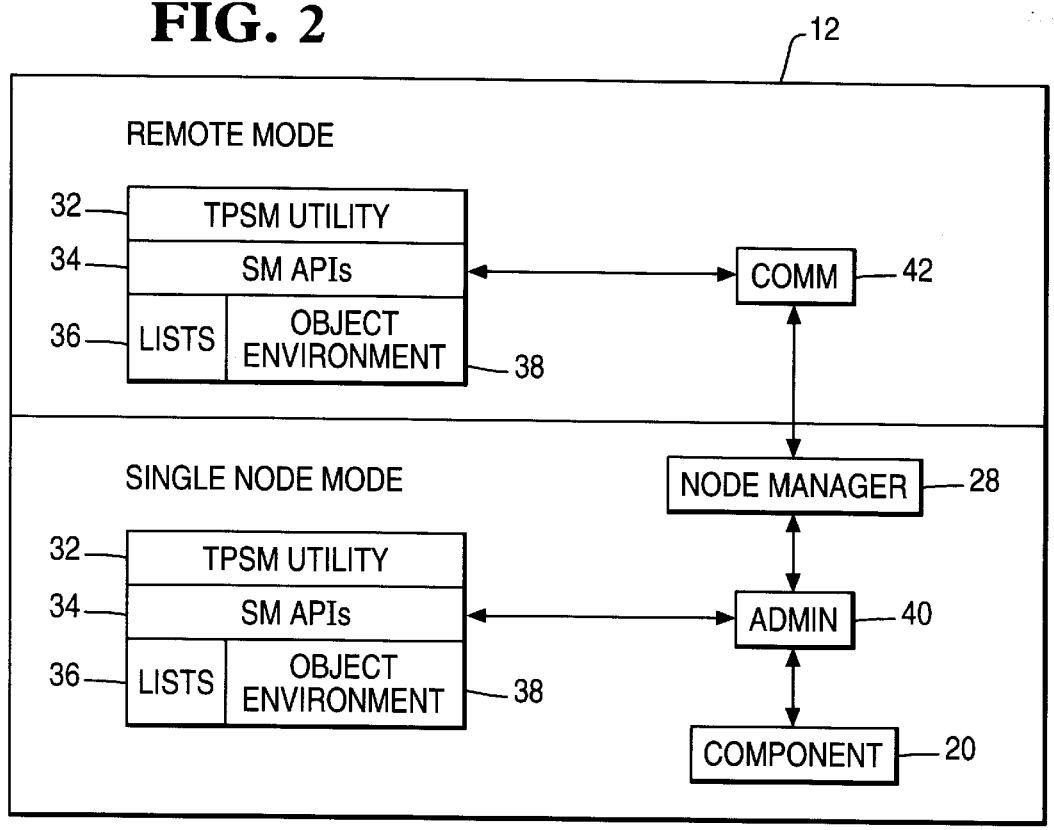
FIG. 2 is a block diagram that illustrates the structure of a systems management application according to the present invention.

FIG. 2 is a block diagram that illustrates the structure of a Transaction Processing System Management (TPSM) utility 32 according to the present invention. The present invention provides an object-based systems management environment that allows the TPSM utility 32 to manage one or more TOP END systems 10, nodes 12, and components 20.

The TPSM utility 32 comprises one or more object programs that are linked or bound to one or more component libraries known as an SM Applications Programming Interface (API) 34. The SM API 34 provides the functions necessary for the desired systems administration. The TPSM utility 32 and SM API 34 are executed by a computer under the control of an operating system, such as WindowsNT™, UNIX™, etc. The computer may be a workstation 18 or a node 12 connected to the network 10.

Generally, the TPSM utility 32 and SM API 34 are all tangibly embodied in or readable from a computer-readable medium, e.g., one or more of the fixed and/or removable data storage and/or data communications devices 16 coupled to the computer 12 or 18. Moreover, the TPSM utility 32 and SM API 34 are both comprised of instructions which, when read and executed by the computer 12 or 18, causes the computer 12 or 18 to perform the steps necessary to implement and/or use the present invention. Under control of the operating system, the TPSM utility 32 and SM API 34 may be loaded from the devices 16 into the memory of the computer 12 or workstation 18 for use during actual operations, or can be entered by the operator at a workstation 18.

The TPSM utility 32 allows the user to specify systems 10, nodes 12, and/or components 20 that are to be manipulated by the systems management tools. These tools provide management support for diagnostics, connection and disconnection from the system 10, status information, alert levels, message routing, and recovery transaction processing.

The TPSM utility 32 provides access to perform local and global administration of a TOP END system. The TPSM utility 32 uses flags to target the request. Each of the flags have different targeting requirements. In general, one should specify the system, the node, and the component information, because most functions are directed to active components. Exceptions to this are listed in the FUNCTIONS section.

The TPSM utility 32 uses the SM API 34 to retrieve configuration data for TOP END systems 10, make requests to TOP END systems 10, nodes 12 and components 20, process responses from TOP END systems 10, nodes 12 and components 20, and process incoming alerts from TOP END systems 10, nodes 12 and components 20.

The SM API 34 manipulates lists 36 and an object environment 38 in performing the systems management functions. The SM API 34 also uses the existing transport mechanism of TOP END systems 10 for communicating administrative requests and responses between nodes 12 and components 20 in TOP END systems 10.

As shown in FIG. 2, the TPSM utility 32 may be executed in either a local or a remote mode of operation. In the local mode, the TPSM utility 32 makes requests directly to an ADMIN process 40. The ADMIN process 40 is responsible for forwarding administrative requests to the desired TOP END nodes 12 and components 20 and for returning responses to the node 12.

In the remote mode, the TPSM utility 32 makes requests to a communications or transport process 42, which forwards the requests to an ADMIN process 40 on the appropriate node 12 in the TOP END system 10. The ADMIN process 40 then performs the desired function, transmits it to another component 20 on the node 12 or another node 12, and also forwards responses back to the node 12 via the communications process. The default mode of operation will be "remote" if the TPSM utility 32 is running from an administrative node 12 and "local" otherwise.

The TPSM utility 32 is intended as a user interface to the TOP END system 10 to manage the TOP END system 10 on an as-needed basis. The TPSM utility 32 may provide a temporary or permanent graphical interface or be a temporary or permanent agent which gathers information for a higher level management application. Having the management environment readily available allows such a TPSM utility 32 to present the user with the current environment on multiple TOP END systems 10 across multiple nodes 12.

Object Environment

Figure 3:
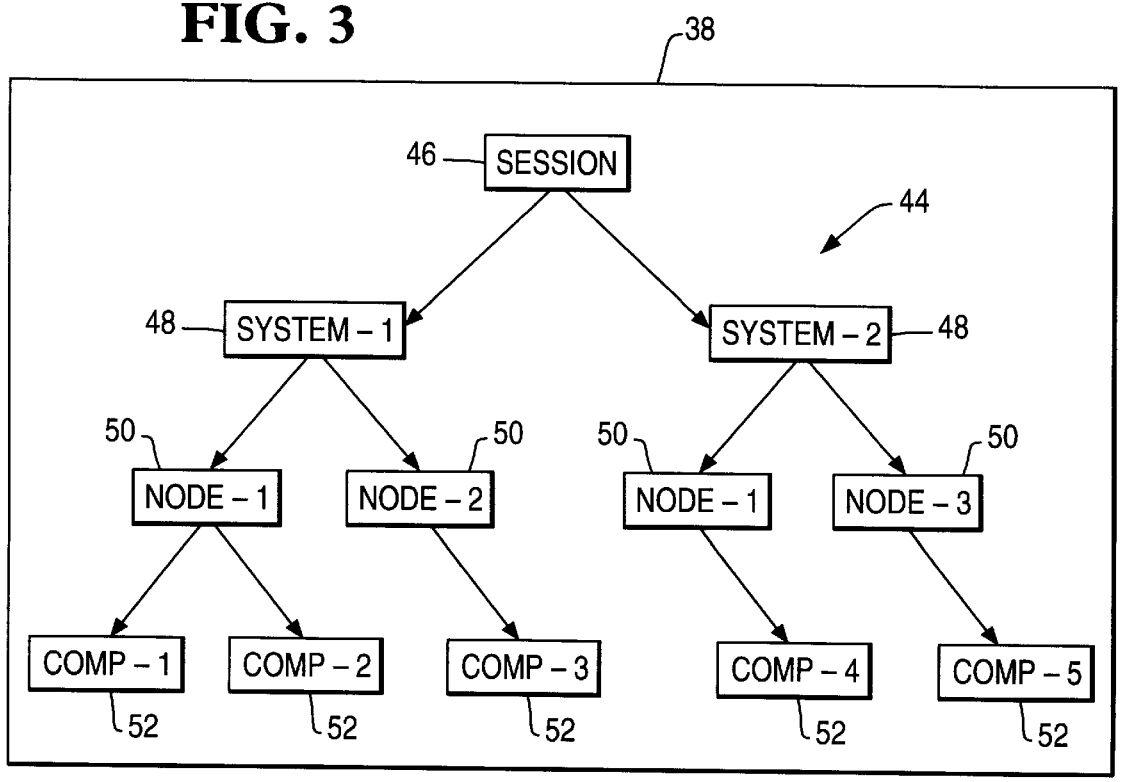
FIG. 3 is a block diagram that illustrates the object environment used for maintaining a description of the operations of one or more TOP END systems according to the present invention.

FIG. 3 is a block diagram that illustrates the object environment 38 used for maintaining a description of the operations of one or more TOP END systems 10 according to the present invention. The object environment 38 is an object based data representation of the TOP END systems 10 stored in the memory of the computer 12 or 18 executing the TPSM utility 32. The "objects" in the object environment 38 represent TOP END systems 10, nodes 12, and components 20. These objects are created and linked together in the memory to form a session hierarchy 44.

A session object 46 resides at the apex of the session hierarchy 44. The TPSM utility 32 interfaces with the session object 46, and a session object 46 is basically a collection of system objects 48. The TPSM utility 32 requests through the session hierarchy information about or reconfiguration of the system objects 48, the nodes 50, or the components 52.

Each system object 48 describes and represents the status of different TOP END systems 10. All system objects 48 are defined to be subordinate to the session object 46. System objects 48 are collections of node objects 50.

Each node object 50 describes the status of a node 12 associated with a TOP END system 10. All node objects 50 are defined to be subordinate to system objects 48. Node objects 50 are collections of component objects 52.

Each component object 52 describes an active component 20 on a node 12. All component objects 52 are defined to be subordinate to node objects 50.

In the example of FIG. 3, the session hierarchy 44 includes a session object 46 that is superior to two system objects 48, each of which is superior to two node objects 50. Note that one of the node objects 50, labeled as node 1, is subordinate to both system objects 48. This is possible since a node 12 can belong to multiple TOP END systems 10. The node object 50 labeled as node 1 has two subordinate component objects 52, while the other node objects 50 only have one component object 52 each.

Each object 46, 48, 50, and 52 is defined to have a set of attributes, services, and relationships with other objects 46, 48, 50, or 52. Attributes include the name, state, and connection status of the object 46, 48, 50, or 52. Services are functions or services provided by the SM API 34 for manipulating objects 46, 48, 50, or 52, such as creation, initialization, reading/writing attributes, and deletion of objects 46, 48, 50, or 52. Relationships between objects 46, 48, 50, or 52 are defined by their interconnections in the session hierarchy 44.

Each of the objects 46, 48, 50, or 52 stores sufficient information, in the form of attributes, to identify the object 46, 48, 50, or 52, and to provide the TPSM utility 32 with management information about the object 46, 48, 50, or 52 and its associated TOP END system 10, node 12, and component 20. Each system object 48, node object 50, and component object 52, for example, would contain the name of the associated system 10, node 12, or component 20, as well as current monitoring status, error log information, alert severity level, location of key files, and a list of processing elements.

Figure 4:
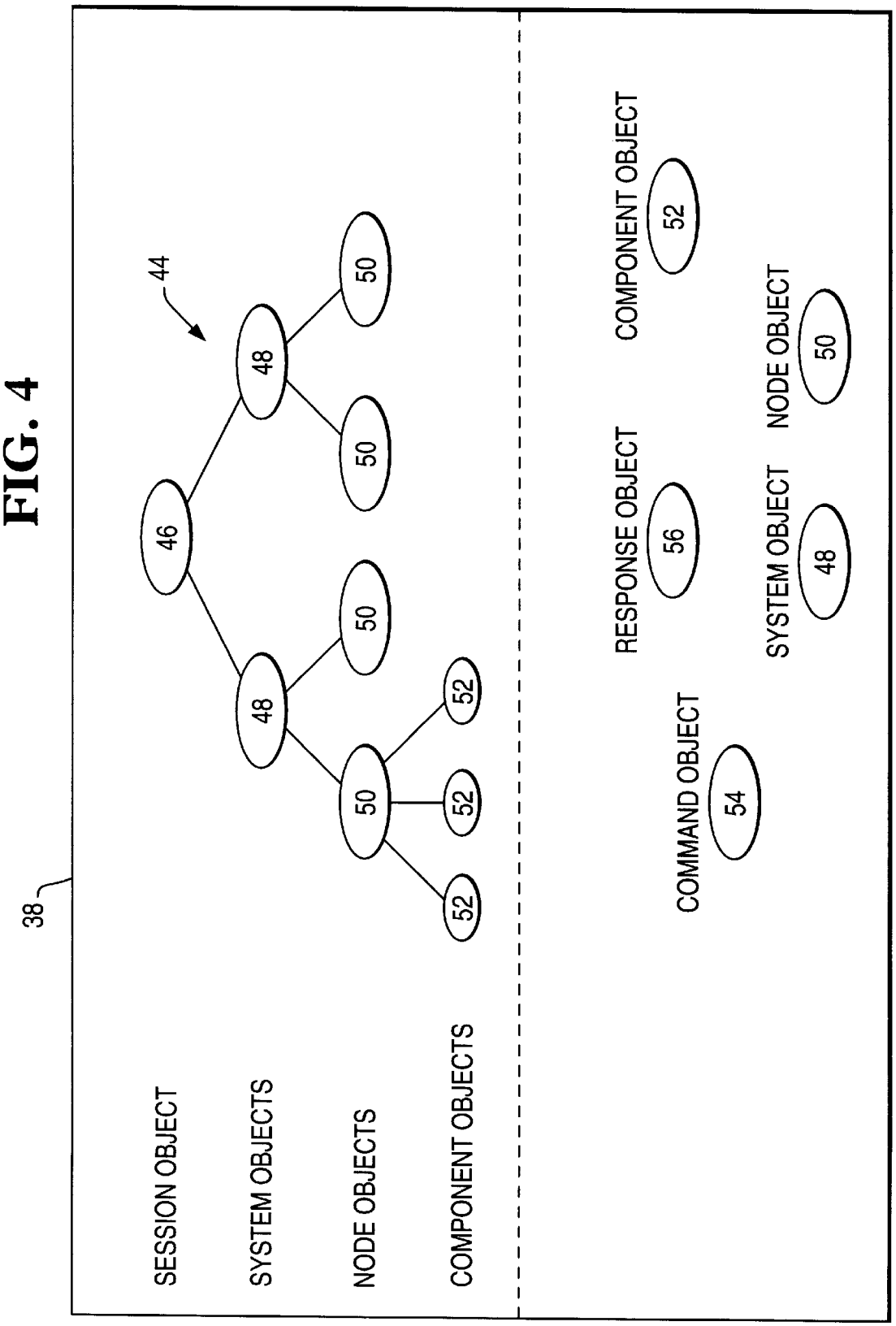
FIG. 4 is a block diagram that also illustrates the object environment used for describing the TOP END system according to the present invention.

FIG. 4 is a block diagram that also illustrates the object environment 38 used for describing the TOP END system 10 according to the present invention. In this illustration, there are also a number of objects outside the session hierarchy 44, including command objects 54 and response objects 56.

In addition, as shown in FIG. 4, there may be system objects 48, node objects 50, and component objects 52 outside the session hierarchy 44.

Command objects 54 and response objects 56 do not occupy a place in the session hierarchy 44, but are part of the object environment 38. They are used by the TPSM utility 32 to send and to receive messages to and from objects 48, 50, or 52 in the session hierarchy 44.

The command object 54 describes a systems administrative request targeting a system 10, node 12 or component 20 that is generated by the TPSM utility 32. The supported functions available to the request include, but are not limited to, signing on and off systems 10 and nodes 12, and systems administrative functions including startup, shutdown, status, messages, connections, configurations, controls, and diagnostics. Command objects 54 can be set up to target any of the objects 48, 50, or 52 in the hierarchy 44, and their associated system 10, node 12 or component 20. When sent to that object 48, 50, or 52, the information from the command object 54 is transmitted to the actual system 10, node 12, or component 20 associated with the object 48, 50, or 52, where it is processed by the appropriate processing element, such as an ADMIN process 40 on the node 12 or a specific component 20 on the node 12, depending on the type of request.

The response object 56 stores the response received from a system 10, node 12, or component 20 targeted by a command object 54. These responses include those from explicit requests made via command objects 54 and unsolicited messages from the system 10, node 12, or component 20. Unsolicited messages can be either updates to the status of the system 10, node 12, or component 20, or alert messages received from systems 10, nodes 12, or components 20.

TPSM Functions

The TPSM (Transaction Processing System Management) utility 32 of the present invention is an interface to the System Management APIs. With TPSM, the administrator can send any supported TOP END administrative request to any TOP END component or node. If TPSM is running on an administrative node, it provides access to all systems and nodes accessible from that node.

The command object 54 describes a systems administrative request targeting a system 10, node 12 or component 20 that is generated by the TPSM utility 32. Command objects 54 can be set up to target any of the objects 48, 50, or 52 in the hierarchy 44, and their associated system 10, node 12 or component 20. When sent to that object 48, 50, or 52, the information from the command object 54 is transmitted to the actual system 10, node 12, or component 20 associated with the object 48, 50, or 52, where it is processed by the appropriate processing element, such as an ADMIN process 40 on the node 12 or a specific component 20 on the node 12, depending on the type of request.

Many of the functions require function options to be specified for the function to be performed. Each flag or function described has specific options associated with it. Only one function is allowed per request; however, multiple function options may be specified for any one request. Further, the option specification flag must be the last TPSM flag when specified in a command.

In general the TPSM utility 32 uses a letter designator as a flag to instruct the system 10 where to route the request. The list of flags is as follows:

–g: specifies session node 12;

–s: specifies target system 10;

–d: specifies target node 12;

-t: specifies target component 20 by type;

-n: specifies target component 20 by name;

-c: specifies target component 20 by number;

-h: prints summary of available options and functions;

-l: requests logging of systems management requests;

-z: specifies the use of debug flags;

-v: forces the display of messages showing progress of the systems management request;

-x: forces the display of data without the header information; and

-f: provides the function for the above flags to execute.

The functions (specified in the -f portion of the TPSM utility 32) are listed below, along with their specified options, where the function name is listed in bold type:

startup

The startup function runs a component startup script on the target node 12. An option flag is used to specify the name of the script file to run.

shutdown

The shutdown function terminates a specified component 20. This function can also specify the shutdown mode for any known component 20.

nodestatus

The nodestatus function outputs localized node 12 status information concerning a specified node 12.

compstatus

The compstatus function outputs localized status information concerning a specified component 20.

diag

The diag function modifies a diagnostic mode of a specified component 20.

This function also allows reset, modname and modflag, or audit options:

reset

Reset clears all outstanding diagnostic requests which are made through the modname, modflags, or audit options.

modname=<module name>, modflags=<module flag>

Modname performs module diagnostics which are only used for low-level debugging of TOP END software. The module name parameter refers to a section of TOP END system 10 software code.

The modflags parameter either turns on or turns off the settings for the specified module.

audit=<diagnostic type>

Audit requests auditing be performed for one of the TOP END APIs 34.

sendmsg

The sendmsg function sends a message to a specified component 20. This function also allows an option to specify the message to be sent to application components 20.

configure

The configure function configures runtime parameters for a specified component 20. The configure function also allows for several options, as follows:

sdnormal=<hh:mm: ss>

This option specifies the amount of time for a component 20 to complete normal shutdown processing.

sdimmediate=<hh:mm:ss>

This option specifies the amount of time for a component 20 to complete immediate shutdown processing.

sdnormalclient=<hh:mm:ss>

This option specifies the amount of time the node manager 28 will allow a client to complete normal shutdown processing.

sdimmedclient=<hh:mm:ss>

This option specifies the amount of time the node manager 28 will allow a client to complete immediate shutdown processing.

sdnormalserver=<hh:mm:ss>

This option specifies the amount of time the node manager 28 will allow a server to complete normal shutdown processing.

sdimmedserver=<hh:mm:ss>

This option specifies the amount of time the node manager 28 will allow a server to complete immediate shutdown processing.

sdnmni=<hh:nm:ss>

This option specifies the amount of time the node manager 28 will allow a network interface, TMC, or CSP component 20 to complete shutdown processing.

secaudit=<security mode>

This option configures the security auditing mode.

restartinterval=<hh:mm:ss>

This option specifies the automatic restart interval.

restartsperinterval=<number>

This option specifies the number of automatic restarts per interval.

restarttotal=<number>

This option specifies the total number of automatic restarts.

ernodemethod=<route method>

This option specifies the method of enhanced routing for nodes 12.

erservermethod=<route method>

This option specifies the method of enhanced routing for servers.

erstarttime=[now|<hh:mm:ss:>]

This option allows the user to specify when logging of enhanced routing statistics should begin.

erloginterval=<hh:mm:ss>

This option specifies intervals between log entries.

ernodedesire=<number>

This option specifies the desirability factor for a node 12.

erlocalremote=<#/#>

This option specifies the target ratio of local processes to remote processes.

ercopypotential=<#/#>

This option specifies the target ratio of active server copies to maximum potential copies.

ernonpartmethod=<route method>

This option configures how requests are routed among participant and non-participant nodes 12.

msrprocess

This option forces the node manager 28 to reprocess the transaction processing services (tp_services) file.

rtqmaxqsize=<number>

This option configures the maximum queue size for the specified RTQ manager.

rtqworkload=<number>

This option configures the workload of the specified RTQ manager.

rtqminworkers=<number>

This option configures the minimum number of workers associated with the specified RTQ manager.

rtqmaxworkers=<number>

This option configures the maximum number of workers associated with the specified RTQ manager.

rtqminservice=<number>

This option sets the minimum service rate for the RTQ manager.

rtqmaxservice=<number>

This option sets the maximum service interval for the RTQ manager.

rtqinterval=<hh:mm:ss>

This option sets the interval for checks on queue processing time.

rtgretrycount=<number>

This option sets the number of times an RTQ worker will retry processing a request which does not complete successfully.

rtqretrywait=<hh:mm:ss>

This option sets the amount of time the worker will wait before retrying a failed request.

rtqavgwait=<hh:mm:ss>

This option sets the amount of time a worker can wait before being considered idle.

atomode=<ato mode>

This option configures the Automatic Throughput Optimization (ATO), which balances the workload on a node 12 by managing the number of copies of specific application component servers.

atomincopies=<number>

This option specifies the minimum number of copies to be managed by ATO.

atomaxcopies=<number>

This option specifies the maximum number of copies to be managed by ATO.

atominmsgload=<number>

This option specifies the minimum message load for ATO processing.

atomaxmsgload=<number>

This option specifies the maximum message load for ATO processing.

atoturnaround=<hh:mm:ss>

This option specifies the ATO turnaround time for the target components.

atointerval=<hh:mm:ss>

This option configures the CTL's ATO processing interval time.

atofrequency=<number>

This option configures the CTL's ATO reporting frequency.

fmtcache=<number>

This option configures the format cache size.

connect

The connect function establishes a network connection between two nodes 12.

disconnect

The disconnect function disconnects the network connection between two nodes 12.

list

The list function requests a list of TOP END objects 50. The list function also has options, as follows:

components

This option lists all active components 20.

startups

This option lists all startable components 20.

nodes

This option lists all nodes 12 in the TOP END system 10.

systems

This option lists all TOP END systems 10.

setalert

The setalert function sets node 12 alert levels.

logcopy

The logcopy function requests a copy of a log file on an end node 12. The logcopy function also has several options, as follows:

sourcefile

This option, when used with the logcopy option, specifies a path and name of a source log file.

old

This option, when used with the logcopy option, specifies to also copy to the source log file with an ".old" extension.

destfile=<filename>

This option, when used with the logcopy option, specifies a path and name of a destination log file.

logreset

The logreset function requests a log file be emptied on an end node 12.

sourcefile=<filename>

This option specifies a path and name of a log file to be emptied.

old

This option, when used with the logcopy option, specifies to also empty the source log file with an ".old" extension.

logtransport

The logtransport function is a global node administration request to transport a log file from an end node 12 to an admin node 12. The logtransport function has several options, as follows:

sourcefile

This option, when used with the logtransport option, specifies a path and name of a log file to transport.

old

This option, when used with the logtransport option, specifies to also transport the source log file with the ".old" extension.

destfile=<filename>

This option, when used with the logtransport option, specifies a path and name to receive the transported log file on the admin node 12.

logtrim

The logtrim function is a request to remove selected records from an error log on an end node 12. The logtrim function has several options, as follows:

sourcefile

This option, when used with the logtrim option, specifies a path and name of a log file to trim.

old

This option, when used with the logtrim option, specifies to also trim the error log file with the ".old" extension.

startdate=<mm/dd/yy>

This option specifies the begin date of which to delete the error log record.

enddate=<mm/dd/yy>

This option specifies the end date of which to delete the error log record.

starttime=<hh:mm>

This option specifies the start time of which to delete the error log record.

endtime=<hh:mm>

This option specifies the end time of which to delete the error log record.

timezone=[local|remote]

This option specifies the time zone from which to apply the time range to remove error log record(s).

3270disconnect

This function disconnects a 3270 session object 46 from a component 20.

Recoverable Transaction Queuing (RTO)

The RTQ has several functions and options that allow the operator to specify functions and options to components 20 to list RTQ information, changes the state or priority of RTQ queues, recovers an RTQ, and perform RTQ actions.

rtqlist

The Recoverable Transaction Queuing (RTQ) rtqlist function lists and filters RTQ queue information.

product=<string>

This option, when used with rtqlist, filters the selection according to the product name.

function=<string>

This option, when used with rtqlist, filters the selection according to the function name.

txkeystart=<number>

This option, when used with rtqlist, specifies the start range of transaction key for filters.

txkeyend=<number>

This option, when used with rtqlist, specifies the end range of transaction key for filters.

entrytag=<string>

This option, when used with rtqlist, specifies the entry tag for the filter.

requestidstart=<number>

This option, when used with rtqlist, specifies the start range by request identifier for selection filtering.

requestidend=<number>

This option, when used with rtqlist, specifies the end range by request identifier for selection filtering.

currentstate=<qstate>

This option, when used with rtqlist, specifies the current queue state for filtering.

procdatestart=<mm/dd/yy>

This option, when used with rtqlist, specifies the start range of the process date for filtering.

proedateend=<mm/dd/yy>

This option, when used with rtqlist, specifies the end range of the process date for filtering.

queuedatestart=<mm/dd/yy>

This option, when used with rtqlist, specifies the start range of the queuing date for filtering.

queuedateend=<mm/dd/yy>

This option, when used with rtqlist, specifies the end range of the queuing date for filtering.

proctimestart=<hh:mm:ss>

This option, when used with rtqlist, specifies the start range of the processing time for filtering.

proctimeend=<hh:mm:ss>

This option, when used with rtqlist, specifies the end range of the processing time for filtering.

queuetimestart=<hh:mm:ss>

This option, when used with rtqlist, specifies the start range of the queuing time for filtering.

queuetimeend=<hh:mm:ss>

This option, when used with rtqlist, specifies the end range of the queuing time for filtering.

listformat=<output format>

This option, when used with rtqlist, specifies the output format for the queue list.

rtqstate

The rtqstate function changes the state of RTQ queues.

product=<string>

This option, when used with rtqstate, filters the selection according to product name.

function=<string>

This option, when used with rtqstate, filters the selection according to function name.

txkeystart=<number>

This option, when used with rtqstate, specifies the start range of transaction key for filter.

txkeyend=<number>

This option, when used with rtqstate, specifies the end range of transaction key for filtering.

entrytag=<string>

This option, when used with rtqstate, specifies the entry tag for filtering.

requestidstart=<number>

This option, when used with rtqstate, specifies the start range by requesting an identifier for selection filtering.

requestidend=<number>

This option, when used with rtqstate, specifies the end range by requesting an identifier for selection filtering.

currentstate=<qstate>

This option, when used with rtqstate, specifies the current queue state for filtering.

proodatestart=<mm/dd/yy>

This option, when used with rtqstate, specifies the start range of the process date for filtering.

procdateend=<mm/dd/yy>

This option, when used with rtqstate, specifies the end range of the process date for filtering.

queuedatestart=<mm/dd/yy>

This option, when used with rtqstate, specifies the start range of the queuing date for filtering.

queuedateend=<mm/dd/yy>

This option, when used with rtqstate, specifies the end range of the queuing date for filtering.

proctimestart=<hh:mm:ss>

This option, when used with rtqstate, specifies the start range of the processing time for filtering.

proctimeend=<hh:mm:ss>

This option, when used with rtqstate, specifies the end range of the processing time for filtering.

queuetimestart=<hh:mm:ss>

This option, when used with rtqstate, specifies the start range of the queuing time for filtering.

queuetimeend=<hh:mm:ss>

This option, when used with rtqstate, specifies the end range of the queuing time for filtering.

newstate=<rtqstate>

This option, when used with rtqstate, specifies the new state for an rtq request.

rtqrecover

The rtqrecover function recovers an RTQ on an operational node 12.

rtqaccess

The rtqaccess function enables/disables queuing and/or processing of RTQ requests.

rtqworkers

The rtqworkers function changes the number of RTQ worker components 20.

Extended Recovery (xr)

xrinit

The xrinit function initiates the TOP END system 10 Transaction Processing Extended Recovery (tp_xr_recover) utility to support Extended Recovery.

xrmerge

The xrmerge function initiates the TOP END system 10 transaction identification (tp_xr_xidmerge) utility to merge a transaction identification (XID) log file from a failed node 12 into an XID log file on the recovery node 12.

xrxidfile

This option, when used with xrmerge, specifies the xrxidfile name for Extended Recovery.

faildnode=<nodename>

This option, when used with xrmerge, specifies the failed node 12 name.

Systems Management Logic

Figure 5:
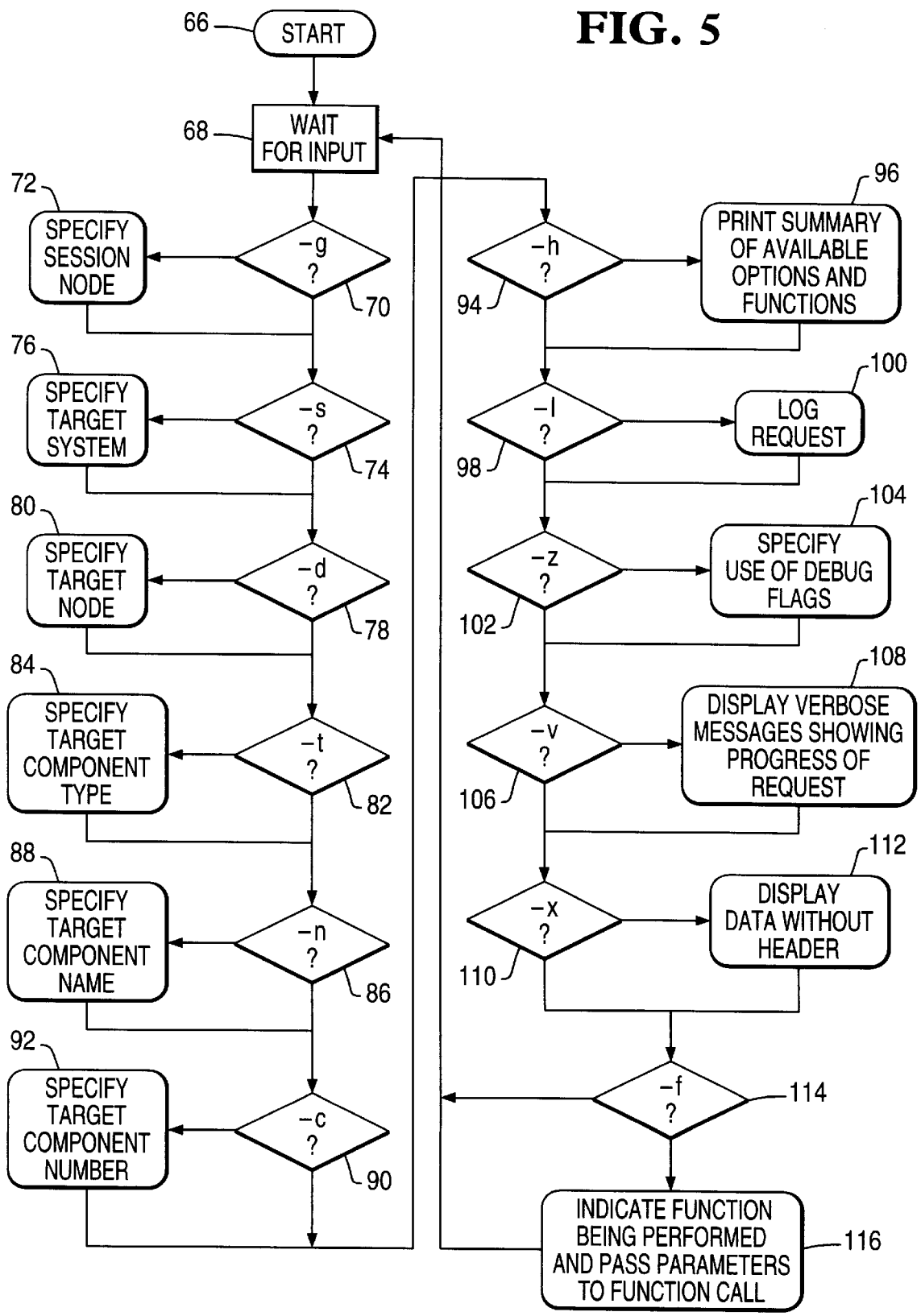
FIG. 5 is a flowchart that further describes the processing of the systems management application using the systems management application programming interface to manage a TOP END system.

FIG. 5 is a flowchart that further describes the processing of the TPSM utility 32 using the SM API 34 to manage a TOP END system 10.

Block 66 represents the TPSM utility 32 initializing the session hierarchy 44 before performing any other tasks involving the SM API 34 and the TOP END system 10. This is done by creating the session object 46, and then optionally modifying the attributes of the session object 46. After the session object 46 has been created, block 66 also creates one or more system objects 48, and inserting the system objects 50 into the session hierarchy 44.

Depending on the information in the TPSM utility 32 entry, certain functions are performed by the SM API 34. The inputs to the TPSM utility 32 modify certain system objects 48 in the object environment 38.

Block 70 represents a –g request in the TPSM utility 32. If a –g request is made in block 70, control passes to block 72. Block 72 specifies the session node name where TOP END communication services reside. Blocks 70 and 72 are only useful for WindowsNT™ users/applications. Block 72 passes control to block 74. If the –g option is not specified in block 70, control passes to block 74.

Block 74 represents a –s request in the TPSM utility 32. If a –s request is made in block 74, control passes to block 76. Block 76 is used to specify the target TOP END system 10. Using the block 74 option will override the environment variable. If the –s option is not specified in blocks 74 and 76, the user will be prompted for a system name. Block 76 passes control to block 78. If the –s option is not specified in block 74, control passes to block 78.

Block 78 represents a –d request in the TPSM utility 32. If a –d request is made in block 78, control passes to block 80. Block 80 is used to specify the target node 12 in the TOP END system 10. If the –d option is not specified in blocks 78 and 80, the target node is the local node. Block 80 passes control to block 82. If the –d option is not specified in block 78, control passes to block 82.

Block 82 represents a –t request in the TPSM utility 32. If a –t request is made in block 82, control passes to block 84. Block 84 is used to specify the target component 20 by type. If the –t option is not specified in blocks 82 and 84, components 20 will be targeted regardless of their type. Once block 84 has targeted all components 20 by type, block 84 passes control to block 86. If the –t option is not specified in block 82, control passes to block 86.

Block 86 represents a –n request in the TPSM utility 32. If a –n request is made in block 86, control passes to block 88. Block 88 is used to specify the target component 20 by name. If the –n option is not specified in blocks 86 and 88, components will be targeted regardless of their name. Once block 88 has target all components 20 by name, control passes to block 90. If a –n request is not made in block 86, control passes to block 90.

Block 90 represents a –c request in the TPSM utility 32. If a –c request is made in block 90, control passes to block 92. Block 92 is used to specify the target component 20 by number. If the –c option is not specified in block 90, components 20 will be targeted regardless of their instance number. Once components 20 are targeted by number in block 92, control passes to block 94. If the –c option is not specified in block 90, control passes to block 94.

Block 94 represents a –h request in the TPSM utility 32. If a –h request is made in block 94, control passes to block 96. Block 96 prints a brief summary of the available options and functions including a list of the acceptable types. If the –t option is also used, then help on the request in block 94 is specific to the component 20 type. This is useful for configure requests. Once block 96 prints the summary, control passes to block 98. If the –h option is not specified in block 94, control passes to block 98.

Block 98 represents a –l request in the TPSM utility 32. If a –l request is made in block 98, control passes to block 100. Block 100 performs logging of the request in TPSM utility 32 into a computer-readable file. Once the logging is complete, block 100 passes control to block 102. If the –l option is not specified in block 98, control passes to block 102.

Block 102 represents a –z request in the TPSM utility 32. If a –z request is made in block 102, control passes to block 104. Block 104 specifies debug flags for use when debugging the TPSM utility 32. Once debug flags have been specified in block 104, control passes to block 104. If the –z option is not specified in block 102, control passes to block 106.

Block 106 represents a –v request in the TPSM utility 32. If a –v request is made in block 106, control passes to block 108. Block 108 forces the TOP END system 10 to display verbose messages which shows the progress of the request on the TPSM utility 32. Once the system 10 has been forced to display the messages, block 108 passes control to block 110. If the –v request is not made in block 106, control passes to block 110.

Block 110 represents a –x request in the TPSM utility 32. If a –x request is made in block 110, control passes to block 112. Block 112 forces the TOP END system 10 to display data without header information. Block 112 is useful when the output of the TPSM utility 32 will be parsed for scripting purposes. Once the system 10 has been forced to display the data without the header information in block 112, control passes to block 114. If a –x request is not made in block 110, control passes to block 114.

Block 114 represents a –f request in the TPSM utility 32. If a –f request is made in block 114, control passes to block 116. Block 116 will indicate the function being performed by the TPSM utility 32, and indicate the function options to pass to the TOP END system 10. If a –f request is not made in block 114, control passes back to block 68. Once the function and function options have been read by the computer in block 116, control passes back to block 68. Block 116 also represents the TPSM utility 32 signing onto the associated TOP END systems 10 represented by the system objects 48.

Command and response processing

Figure 6:
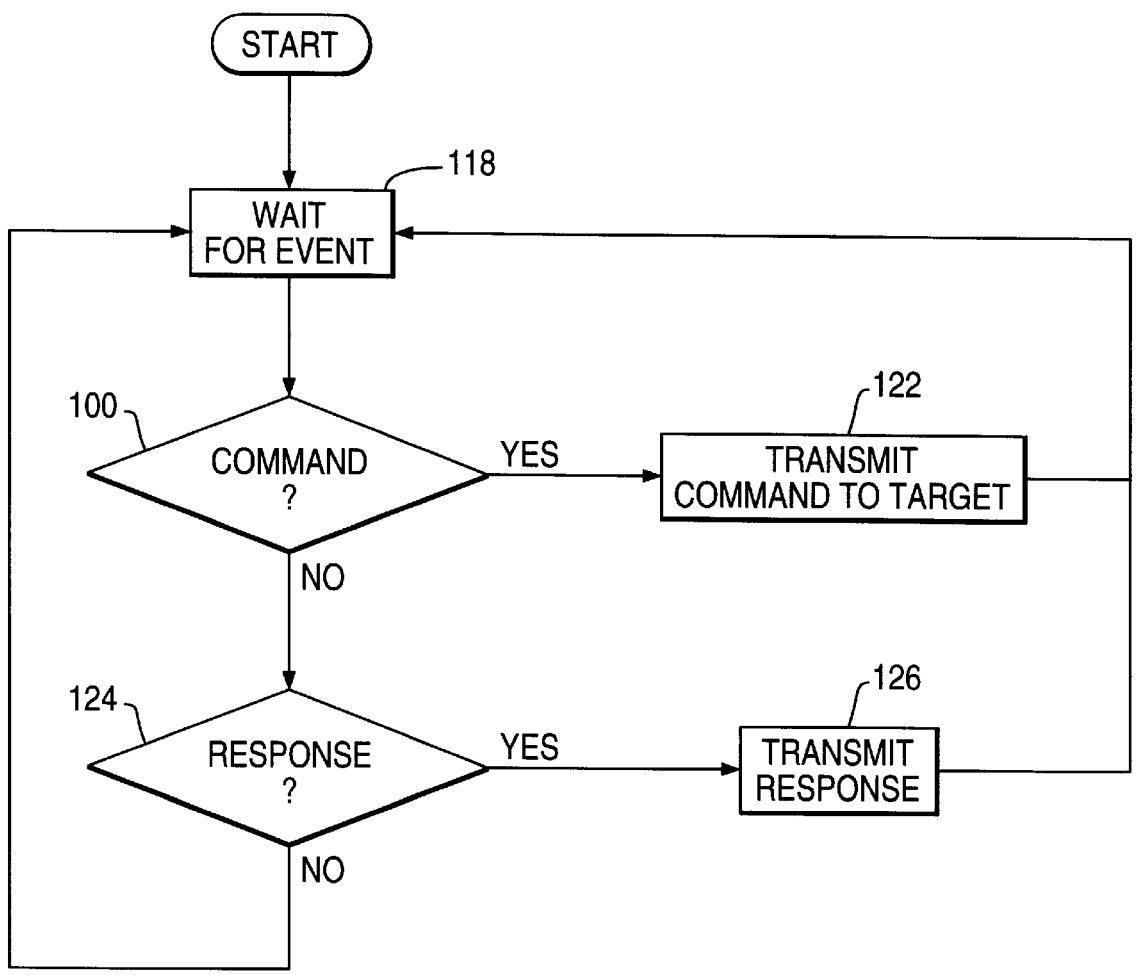
FIG. 6 is a flowchart that represents the command and response processing phase of the ADMIN process.

FIG. 6 is a flowchart that represents the command and response processing phase of the ADMIN process 40. Block 118 represents the ADMIN process 40 waiting for the next event, either a command from the TPSM utility 32 or a response from a targeted TOP END system 10, node 12, and/or component 20 to a prior command transmitted by the ADMIN process 40.

Block 120 is a decision block that represents the ADMIN process 40 determining whether the input is a command from the TPSM utility 32. If so, control transfers to block 122; otherwise, control transfers to block 124. Block 122 represents the ADMIN process 40 translating the command information into the appropriate message, locating the targeted systems 10, nodes 12, and/or components 20, and transmitting the message to the targeted components 20, nodes 12, and/or systems 10.

The success of a command depends on a number of factors:

Transport of the command information to the targeted system 10, node 12, and/or component 20;

Recognition of the command information by targeted systems 10, nodes 12, and components 20;

Receiving responses from the targeted systems 10, nodes 12, and/or components 20; and Transport of responses back to the TPSM utility 32.

Block 122 also represents the ADMIN process 40 transmitting an initial acknowledgment of the command information back to the TPSM utility 32.

Block 124 is a decision block that represents the ADMIN process 40 determining whether the input is a response from a targeted system 10, node 12, and/or component to the prior transmitted command or an unsolicited message. If so, control transfers to block 126; otherwise, control transfers to block 118. Block 126 represents the ADMIN process 40 transmitting the response information back to the TPSM utility 32. In general, the ADMIN process 40 can expect one acknowledgment and zero or more additional responses from each node 12 receiving the prior command. Note that if a system 10 or node 12 or multiple component 20 comprise the target, then there will be multiple sets of responses returned to the ADMIN process 40.

The following commands return additional responses:

node 12 status;

node 12 sign-on; and component 20 status.

Since commands and responses involve inter-process and possibly inter-node communications, there are many reasons why a command may not be received by its target and a response may not be received by the ADMIN process 40. Additionally, TOP END systems 10, nodes 12, and components 20 are not required to respond to administrative requests. Therefore, not receiving a response to a command should not necessarily be construed as a failed command.

The ADMIN process 40 may also receive a number of unsolicited messages from TOP END systems 10, nodes 12, and components 20. These include unsolicited status messages and alert messages. Generally, these unsolicited status messages and alert messages are sent to the ADMIN process 40 as TOP END systems 10, nodes 12, and components 20 startup and shutdown. This allows the ADMIN process 40, and the TPSM utility 32, to maintain an accurate view of the administrative domain without having to poll the TOP END systems 10, nodes 12, and components 20.

Conclusion

In summary, the present invention discloses a method, apparatus, and article of manufacture for object based systems management of a computer network. An object based representation of the network is stored in a memory of a computer. The object-based representation comprises one or more objects linked together in the memory to form a hierarchy, wherein each of the objects represents the network, one or more nodes within the network, or one or more components executed by each of the nodes within the network. Each of the objects stores systems management information about the network, node, or component. An application programming interface performed by the computer manipulates the objects in the memory of the computer to perform systems management functions for the network.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention by limited not by this detailed description, but rather by the claims appended hereto.

What is claimed is:

1. A systems administration apparatus for a computer network, comprising:

a computer having a memory, the computer being connected to a network;

an object-based representation of the network stored in the memory of the computer, wherein the object based representation comprises one or more objects linked together in the memory to form a hierarchy, each of the objects represent the network, one or more nodes within the network, or one or more components executed by each of the nodes within the network, and wherein each of the objects stores systems management information about the network; and utility interface means, performed by the computer, for specifying the objects in the memory of the computer to be manipulated by the computer in performing systems management functions for the network.

2. The systems administration apparatus of claim 1, wherein the means for specifying comprises means for communicating administrative requests between the computer and systems, nodes, and components in the network in accordance with the manipulating of the objects.

3. The systems administration apparatus of claim 1, wherein the means for specifying comprises means for performing a function selected from a group comprising:

specifying a session node in the memory where the object-based representation of the network resides;

specifying a target system to be manipulated by the utility;

specifying a target node to be manipulated by the utility;

specifying a target component type to be manipulated by the utility;

specifying a target component name to be manipulated by the utility;

specifying a target component number to be manipulated by the utility; and displaying status information about the target nodes and the target components.

4. A method of system administration for a computer network, comprising the steps of:

creating an object-based representation of the network in a memory of a computer connected to the network, wherein the object-based representation comprises one or more objects linked together in the memory to form a hierarchy, wherein each of the objects represents the network, one or more nodes within the network, or one or more components executed by each of the nodes within the network, and wherein each of the objects stores systems management information about the network, node, or component; and specifying the objects in the memory of the computer to be manipulated by the computer to perform systems management functions for the network.

5. The method of claim 4, wherein the step of specifying comprises the step of communicating administrative requests and responses between the computer and systems, nodes, and components in the network.

6. The method of claim 4, wherein the step of specifying comprises the step of performing a function selected from the group comprising:

specifying a session node in the memory where the object-based representation of the network resides;

specifying a target system to be manipulated by the utility;

specifying a target node to be manipulated by the utility;

specifying a target component type to be manipulated by the utility;

specifying a target component name to be manipulated by the utility;

specifying a target component number to be manipulated by the utility; and displaying status information about the target nodes and the target components.

7. A program storage device, readable by a computer, tangibly embodying at least one instruction executable by the computer to perform a method of systems administration for a computer network, the method comprising the steps of:

creating an object-based representation of the network in a memory of a computer connected to the network, wherein the object-based representation comprises one or more objects linked together in the memory to form a hierarchy, wherein each of the objects represents the network, one or more nodes within the network, or one or more components executed by each of the nodes within the network, and wherein each of the objects stores systems management information about the network, node, or component; and specifying the objects in the memory of the computer to be manipulated by the computer to perform systems management functions for the network.

8. The program storage device of claim 7, wherein the step of specifying comprises the step of communicating administrative requests and responses between the computer and systems, nodes, and components in the network.

9. The program storage device of claim 7, wherein the step of specifying comprises the step of performing a function selected from a group comprising:

specifying a session node in the memory where the object-based representation of the network resides;

specifying a target system to be manipulated by the utility;

specifying a target node to be manipulated by the utility;

specifying a target component type to be manipulated by the utility;

specifying a target component name to be manipulated by the utility;

specifying a target component number to be manipulated by the utility; and displaying status information about the target nodes and the target components.

* * * * *